United States Patent [19]

Byers, Jr.

[11] 4,086,767
[45] May 2, 1978

[54] TRACK DRIVE CIRCUITS WITH SYNCHRONIZATION AND STEERING SYSTEMS

[75] Inventor: James Otto Byers, Jr., Youngstown, Ohio

[73] Assignee: Commercial Shearing, Inc., Youngstown, Ohio

[21] Appl. No.: 761,608

[22] Filed: Jan. 24, 1977

[51] Int. Cl.² ............................................. F15B 18/00
[52] U.S. Cl. ...................................... 60/395; 60/420; 60/428; 60/486; 60/DIG. 2; 180/6.48
[58] Field of Search ................ 60/391, 395, 420, 427, 60/428, 429, 445, 486; 180/6.48

[56] References Cited

U.S. PATENT DOCUMENTS

| | | | |
|---|---|---|---|
| 3,795,107 | 3/1974 | Ward | 60/420 X |
| 3,914,938 | 10/1975 | Cornell et al. | 60/420 X |

*Primary Examiner*—Edgar W. Geoghegan
*Attorney, Agent, or Firm*—Buell, Blenko & Ziesenheim

[57] ABSTRACT

A hydraulic drive circuit for tracked vehicles is provided in the form of two hydrostatic transmissions, one for each track with a control system for one track acting as a master control and the other transmission control following as a slave unit, except as modified by the signal from a manual steering control.

10 Claims, 7 Drawing Figures

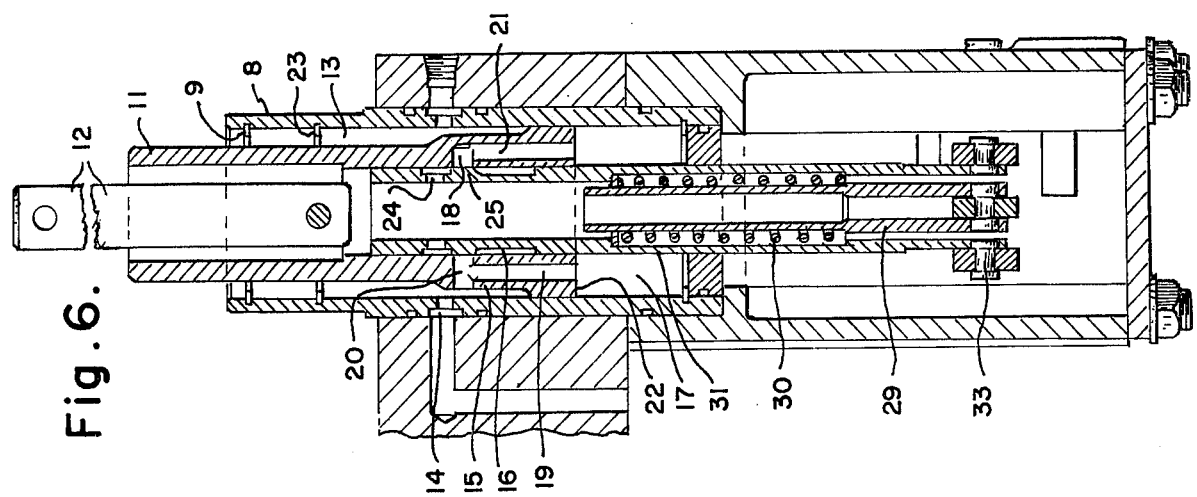
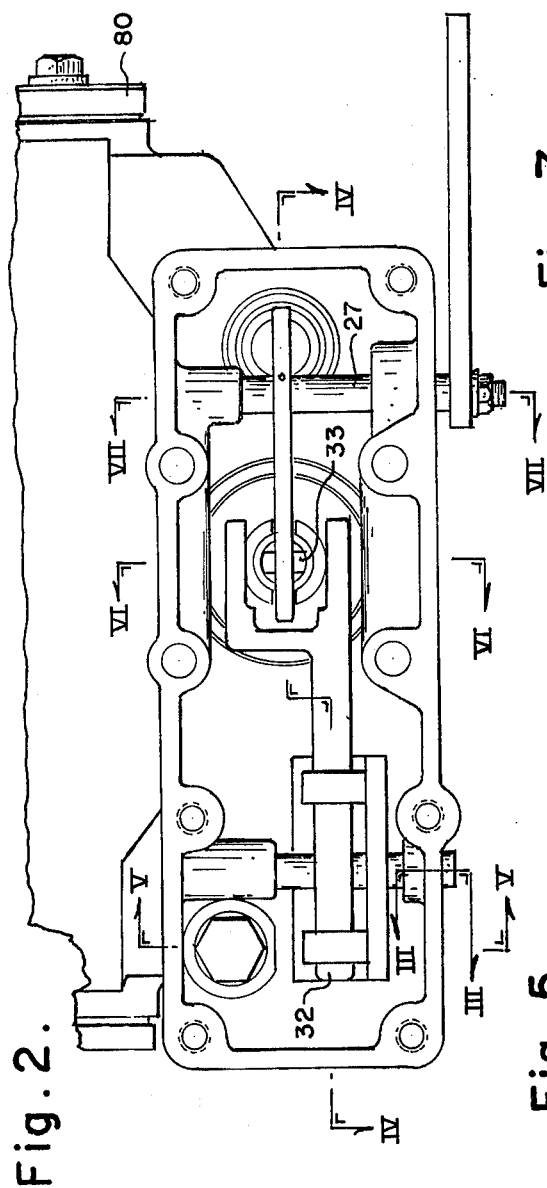
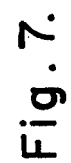
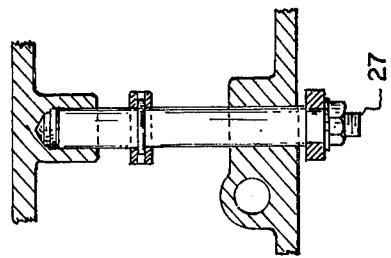
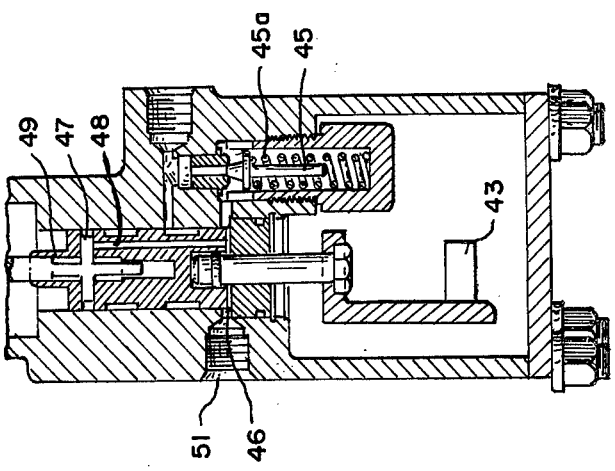

TRACK DRIVE CIRCUITS WITH SYNCHRONIZATION AND STEERING SYSTEMS

This invention relates to track drive circuits with synchronization and steering systems and particularly to a drive system having two hydrostatic transmissions, one for each track.

The problems involved in driving and steering the tracks of tracked vehicles as compared to wheeled vehicles is well known. Such tracked vehicles may take various forms, e.g., earth moving high lifts, dozers, combat tanks, etc. In all cases the problems of driving and steering are essentially the same.

In order to operate efficiently it is desirable to be able to set a maximum speed which is automatically varied in order to maintain a substantially constant horsepower requirement at the engine, regardless of varying load conditions. It is also desirable to limit the maximum pressure in the transmission. At the same time it is necessary to steer the vehicle. This is preferably done by varying the relative speeds of the two tracks. The speed differential determines the turning radius. In order to turn in place, the two tracks must be operated at the same speed but in opposite directions. Since the speed of the vehicle may be controlled by the operator, or by one of several automatic means, as mentioned above, the steering speed must be incorporated into the control system by adding or subtracting the speed differential to or from the sum of the manual and automatic signals.

The present invention provides a drive system having two hydrostatic transmissions, one for each track, a master control system controlling the hydrostatic transmission of one track, a slave control system controlling the hydrostatic transmission of the other track in response to the master control system and a steering control whose signals override the control of the master control system on the slave control system. Preferably, the master control system includes a stroking cylinder operating a variable displacement pump such as the swash plate in a swash plate pump providing drive fluid for the hydrostatic transmissions and a control valve for positioning the stroking cylinder manually and automatically.

In the foregoing general description certain objects, purposes and advantages of this invention are set out. Other objects, purposes and advantages will be apparent from a consideration of the following description and the accompanying drawings in which:

FIG. 2 is a top plan view of a master control system according to FIG. 1;

Figure 4:
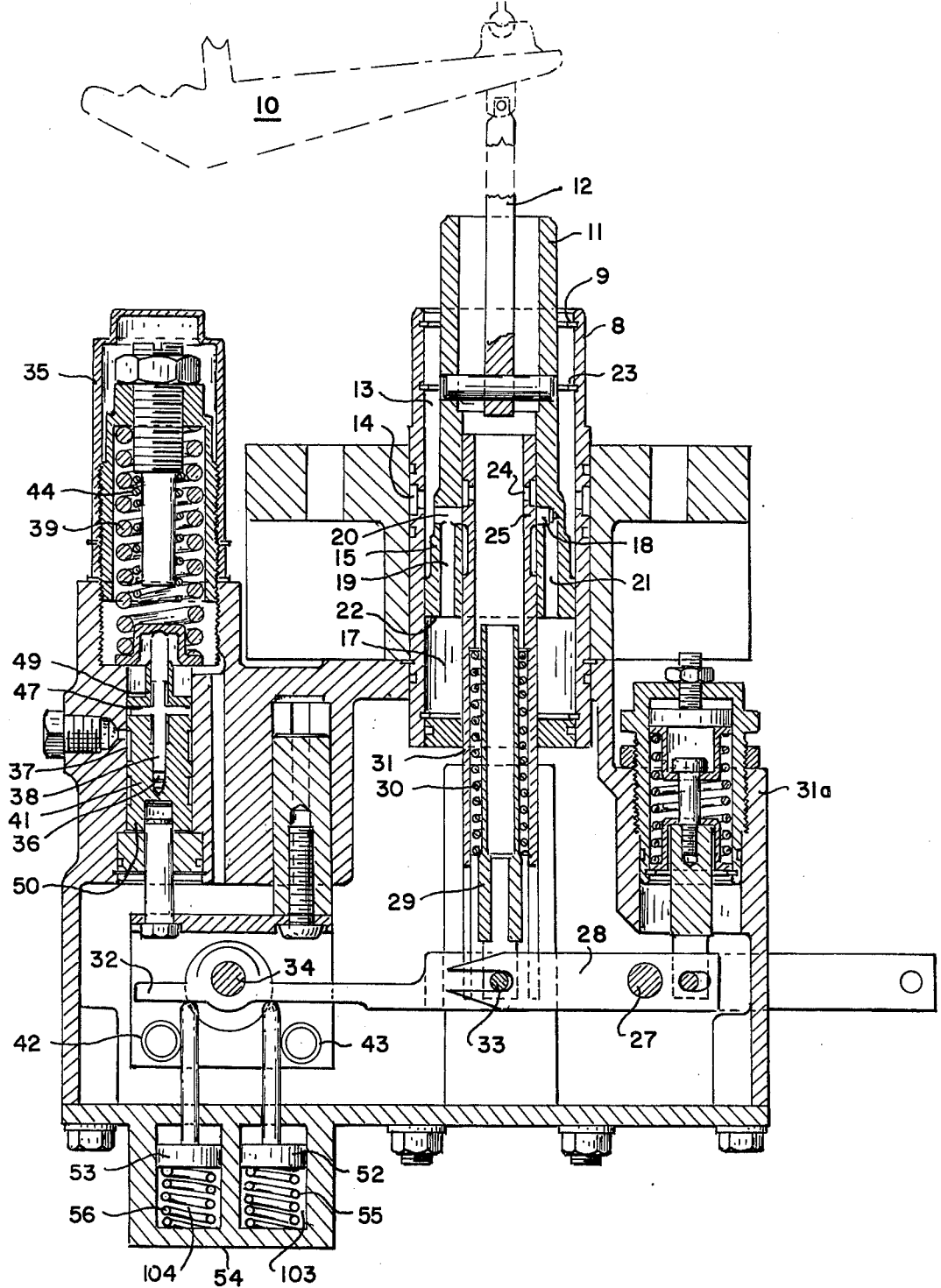

FIG. 3 is a section on the line III—III of FIG. 2;
FIG. 4 is a section on the line IV—IV of FIG. 2;
FIG. 5 is a section on the line V—V of FIG. 2;
FIG. 6 is a section on the line VI—VI of FIG. 2 and
FIG. 7 is a section on the line VII—VII of FIG. 2.

Referring to the drawings I have illustrated in chain line a swash plate 10 of a conventional hydraulic swash plate pump, not illustrated. This pump, which is a variable displacement pump, is used as a part of a conventional hydrostatic transmission. A stroking cylinder 11 is attached to swash plate 10 by link 12. Cylinder 11 is movable in bore 9 of control housing 8. Control fluid flow enters chamber 13 through hole 14 in housing 8. From chamber 13 control fluid passes through passage 15 and annulus 16. When control valve spool 31 is moved towards the swash plate, fluid flow is connected to cavity 17 through passages 18, 19, 20 and 21. Area 22 is approximately two times as large as area 23 so that the pressure of control fluid acting on area 22 will move the control cylinder 11 and swash plate 10 to change the pump's displacement. If the control valve spool 31 is moved away from the swash plate, fluid in cavity 17 will be connected to the pump casing through passages 18, 19, 20, 21 and 24. Control fluid pressure acting on area 23 will now cause the swash plate to move in the opposite direction. when land 25 on the control valve spool 31 covers holes 18 and 20 in the control cylinder 11, the control cylinder will be held in position. The control valve spool 31 can be positioned by lever 26 acting through shaft 27, lever 28, clevis 29 and spring 30. Spring assembly 54 will cause the pump's swash plate to move to the zero displacement position. Spring 30 is installed in spool 31 in such a manner and position that the preload on the spring is sufficient to move the spool 31.

Lever 32 is connected directly to the control valve spool 31 through pins 33. This lever 32 must always move with the control valve spool 31, moving around shaft 34. A horsepower limiter assembly 35 is operatively connected to the control valve assembly and is designed so that high pressure fluid from pump 80 is connected to area 36 on piston 38 and high pressure from pump 81 is connected to area 37 on piston 38. Areas 36 and 37 are the same. Thus, if the displacements of pumps 80 and 81 are equal, the piston 38 can be made to move against springs 39 and 44 in a manner such that piston 41 will position bracket 42 and cams 43 so that lever 32 will move control valve spool 31 in a direction to reduce the pump's displacement regardless of the side of center, so that the pump will maintain a substantially constant horsepower. As lever 32 moves spool 31, spring 30 will be compressed but levers 26 and 28 can be held in the original maximum position. As soon as the pressure or pressures from pumps 80 and 81 drops off or reduce, lever 32 and valve spool 31 will both be forced back to the position called for by lever 26 and spring 30.

Spring 45a is preloaded an amount such that poppet 45 will open at the maximum allowable system pressure. When poppet 45 opens, fluid is connected to cavity 46 at the end of piston 41. As piston 41 starts to move towards springs 39 and 44, hole 47 in piston 41 will be opened through passages 48, 47 and 49 to return. Passage 49 is a small orifice which will start to restrict flow from cavity 46 as the flow rate increases. This will, in turn, allow pressure to build up in cavity 46 and on the face 50 of piston 41. This pressure will, in turn, cause the pump's swash plate to move to a position near the neutral position. Port 51 is also connected to cavity 46. When control fluid is connected to this port, all other signals will be overridden and the pump's swash plate will be moved to near the neutral position. Pistons 52 and 53 are spring loaded by springs 55 and 56 into contact with lever 32.

In operation the operator of the machine can set the maximum flow rate from pump 80 with the control assembly. The control system is such that this manually set signal will be automatically overridden by:

1. a constant horsepower control;
2. a maximum pressure control;
3. one or more external controls; and
4. by one or the other of pistons 52 or 53.

During operation pump 80 drives motor 82 which, in turn, drives feedback pump 83. Feedback pump 83 is in turn connected in a closed loop to pump 84 which is driven by motor 85. If the control system made up of horsepower limiter 35 and stroking cylinder 11 (See FIG. 4) on pump 80 is positioned to cause motor 82 to start to turn (either direction), the flow from pump 83 must go to stroking cylinder 86 on pump 81 until the motor 85 is turning at a speed sufficient to cause pump 84 to require all of the flow from pump 83. If the control stroking cylinder 11 on pump 80 is moved to slow the motor 85, by introducing fluid into hole 14 to move cylinder 11 the excess flow from pump 84 will go to stroking cylinder 86 to cause motor 85 to reduce speed. If pumps 83 and 84 have the same displacement, they will always turn at the same speed, or send a signal to stroke cylinder 86.

This arrangement will assure that both tracks are moving at the same speed regardless of the loads on each track or the leakage from each hydrostatic transmission.

In addition to the control mode just described above, it is also necessary to steer the vehicle. The preferred way to do this steering is to change the relative speeds of the two tracks. The relative speed differential will determine the turning radius. In order to turn in place, the tracks must be turning at the same rates, but in opposite directions. Since the speed of this vehicle may be controlled by the operator or by one of several automatic means over which the operator has no control, the steering speed differential must be added to or subtracted from the sum of the manual and the automatic signals.

Figure 1:
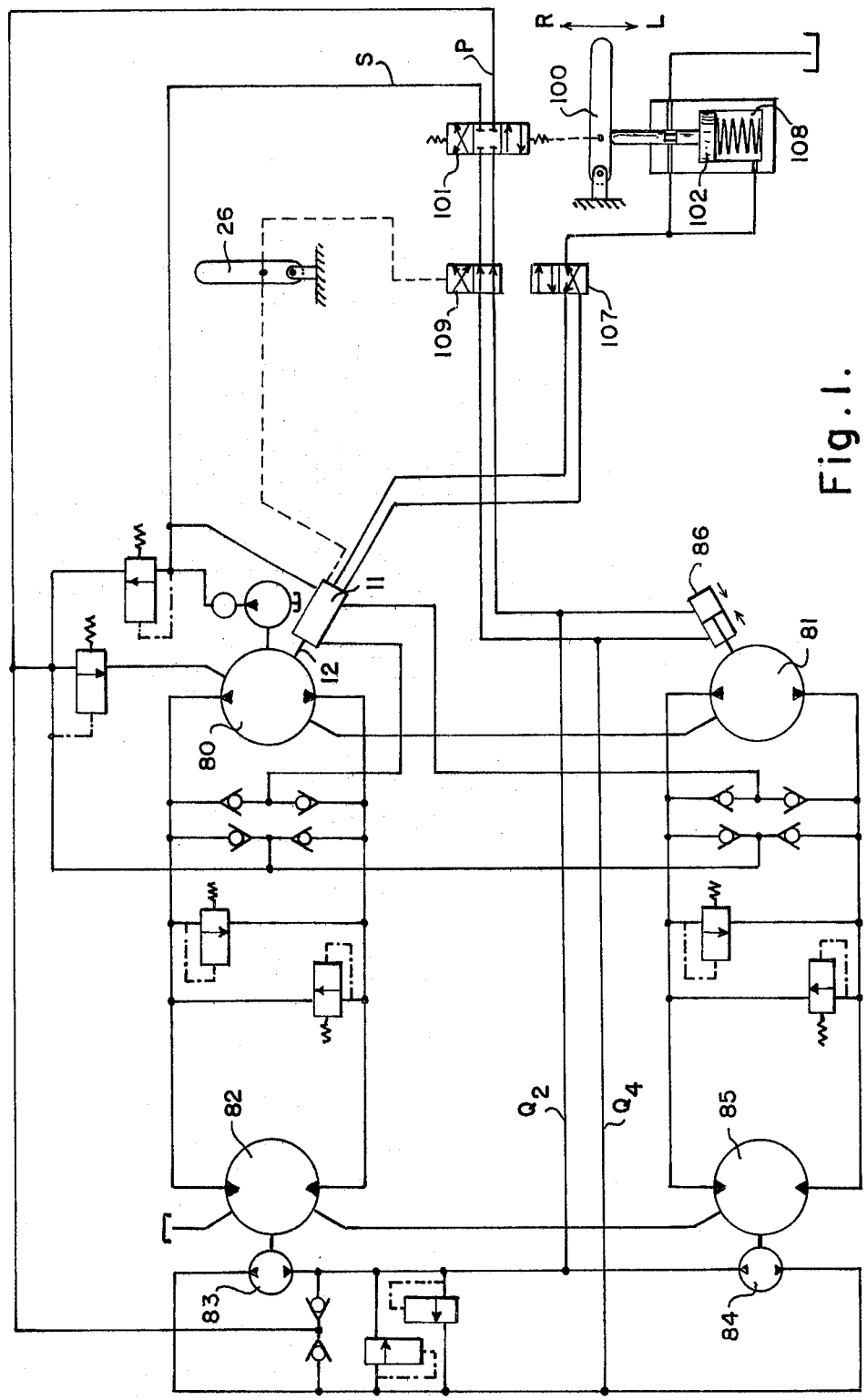
FIG. 1 is a schematic drawing of a track drive circuit including synchronization and steering systems according to this invention.

Using the system of this invention, it is necessary to provide two different steering schemes, depending on the direction of the turn. In order to turn to the right, referring to FIG. 1, the horsepower limiter automatically sets the speed of motor 82 and motor 85 must adjust to run at the same speed. If steering lever 100 is moved toward R (FIG. 1), valve 101 will open, porting flow from line P to line $Q_2$ and from line $Q_4$ to line S. This will produce an increased flow at line $Q_2$ and the pressure will rise until stroking cylinder 86 slows motor 85 speed to the point that the flow rate from pump 84 plus the flow rate across valve 101 equals the flow required by pump 83. The flow rate from pump 84, that is not required for pump 83, will go across valve 101 from line $Q_4$ to tank. It can be seen that as the flow rate is increased from line P to line $Q_2$, motor 85 will slow, stop and reverse direction as the flow rate from line P to line $Q_2$ increases. The horsepower limiter assembly 35 of stroking cylinder assembly 11 still senses the pressure from pumps 80 and 81, but the combined signals are now incorrect because the two pumps do not have the same displacement. Since motor 85 is slowing from the automatically controlled speed, the engine cannot be stalled in a turn and this can be very important.

In order to turn in the opposite or L direction, it is necessary to slow the "Master" track controlled by motor 82 and maintain the "Slave" track controlled by motor 85, at constant speed. As long as steering lever 100 is in the neutral or the R position, piston 102 will remain in the position shown in FIG. 1 and cavities 103 and 104 will be vented to tank allowing springs 55 and 56 to maintain pistons 52 and 53 in contact with lever 32. As soon as lever 100 is moved in the L direction, flow to tank will be cut off from one of the two cavities 103 and 104. The cavity that is cut off is selected by valve 107 and is a function of the direction the dozer is traveling. The cavity that is cut off from tank is connected to cavity 108. When lever 100 is then moved further toward L, fluid is displaced by piston 102 from cavity 108 to either cavity 103 or 104. This fluid causes the control stroking cylinder 11 on pump 80 to reduce speed of motor 82. At the same time valve 101 connects control flow from line P to line $Q_4$. The steering control is designed so that the flow rate passed from line P to line $Q_4$ will cause the speed of motor 85 to increase approximately the same as the speed of motor 82 is decreased by piston 102 and either pistons 52 or 53. This keeps the speed of the "Slave" transmission constant, and decreases the speed of the "Master" transmission. It will be seen that continuing to move the steering control lever 100 towards L will stop motor 82 and cause the motor 82 to reverse direction.

Should the horsepower required by the combination of pumps 80 and 81 exceed the regulated horsepower, the horsepower limiter assembly will cause motor 82 to reduce speed while the control valve 101 keeps the same differential speed between the two tracks and therefore the vehicle will maintain a constant turning radius.

Valve 107 is shifted when the vehicle's direction of travel is reversed. This valve 107 selects the proper cavity 103 or 104 to connect with cavity 108. Valve 109 is necessary to synchronize the function of pumps 83 and 84 with the function of valve 101 when the vehicle's direction is reversed.

In the foregoing specification I have set out certain preferred embodiments and practices of my invention, however, this invention may be otherwise embodied within the scope of the following claims.

I claim:

1. A hydraulic drive circuit for tracked vehicles with synchronization and steering systems comprising a pair of variable displacement type hydraulic pumps, master control means acting to vary the displacement of one of said pumps, manual speed and directional control means acting on said control means to position it to provide a desired speed and directions, slave control means acting on the other of said variable displacement pumps to vary its displacement, a pair of motors, each receiving fluid from one of said pumps and driven thereby, a pair of feed-back pumps, one driven by each of said motors, said pumps being connected in parallel to the slave control means whereby the pumps are normally maintained at the same speed and direction, and a manual steering control means acting on said master control means to control the direction of flow of hydraulic fluid from said pair of swash plate hydraulic pumps to said master control means and slave control means to change selectively the flow rate and direction of flow of hydraulic fluid from said pair of pumps.

2. A hydraulic drive circuit as claimed in claim 1 having a constant horsepower control means receiving a signal from each of said hydraulic pumps and acting in response thereto to act to vary the displacement of said one pump to vary its output and thereby the output of said other pump.

3. A hydraulic drive circuit as claimed in claim 1 having maximum pressure control means in the master control means by reducing the master pumps displacement at a preselected maximum pressure.

4. A hydraulic drive circuit as claimed in claim 1 wherein the variable displacement type hydraulic pumps are swash plate type hydraulic pumps and the master control means acts on the swash plate of one of said pumps and the slave control means acts on the swash plate of the other pump.

5. A hydraulic drive circuit as claimed in claim 4 having a constant horsepower control means receiving a signal from each of said hydraulic pumps and acting in response thereto to act on the swash plate of said one pump to vary its output and thereby the output of said other pump and maximum pressure control means in the master control means by reducing the master pumps displacement at a pre-selected maximum pressure.

6. A hydraulic drive circuit for tracked vehicles as claimed in claim 1 wherein the master control means includes a stroking cylinder operatively connected to the swash plate of said first pump and a hydraulic control valve in said manual speed and directional control delivering hydraulic fluid to said stroking cylinder for selectively positioning the swash plate.

7. A hydraulic drive circuit for tracked vehicles as claimed in claim 3 wherein the master control means includes a constant horsepower control means receiving fluid pressure from each of the swash plate pumps and acting on the control valve to move the stroking cylinder to maintain a constant horsepower in the system.

8. A hydraulic drive circuit for tracked vehicles as claimed in claim 3 wherein the master control includes a pair of spring loaded pistons connected by fluid means to said steering control and selectively receiving fluid therefrom to act on the control valve to control the stroking cylinders and to control the direction of fluid flow to the said one pump.

9. A hydraulic drive circuit as claimed in claim 1 wherein pre-compressed spring means are provided for overriding the master control means.

10. A hydraulic drive circuit as claimed in claim 1 having override signal means selectively reducing the displacement of the two pumps.

* * * * *